US012602644B2

(12) United States Patent
Cho et al.

(10) Patent No.: US 12,602,644 B2
(45) Date of Patent: Apr. 14, 2026

(54) GRAPHIC USER INTERFACE FOR REAL-TIME CARGO HISTORY MANAGEMENT SERVICE BASED ON CARGO TRACKING API LINKAGE

(71) Applicant: Young Soung Cho, Seoul (KR)

(72) Inventors: Young Soung Cho, Seoul (KR); Ji Young Kim, Seoul (KR); Euodia Cho, Seoul (KR)

(73) Assignee: Young Soung Cho, Seoul (KR)

( * ) Notice: Subject to any disclaimer, the term of this patent is extended or adjusted under 35 U.S.C. 154(b) by 0 days.

(21) Appl. No.: 19/000,336

(22) Filed: Dec. 23, 2024

(65) Prior Publication Data

US 2025/0131369 A1 Apr. 24, 2025

Related U.S. Application Data

(63) Continuation-in-part of application No. 18/774,922, filed on Jul. 17, 2024, now abandoned.

(51) Int. Cl.
*G06Q 10/0833* (2023.01)
*G06F 3/0484* (2022.01)

(52) U.S. Cl.
CPC ....... *G06Q 10/0833* (2013.01); *G06F 3/0484* (2013.01)

(58) Field of Classification Search
None
See application file for complete search history.

(56) References Cited

U.S. PATENT DOCUMENTS

| | | | |
|---|---|---|---|
| 10,563,990 B1 * | 2/2020 | Gupta | ................... G06Q 10/08 |
| 2008/0174485 A1 * | 7/2008 | Carani | ................... G06Q 10/08 |
| | | | 342/357.46 |
| 2017/0337511 A1 * | 11/2017 | Shroff | ............... G06Q 10/0833 |
| 2020/0265379 A1 * | 8/2020 | Walker | ................... G06N 20/00 |
| 2022/0261742 A1 * | 8/2022 | Kwon | ................. G05B 19/048 |

FOREIGN PATENT DOCUMENTS

| | | | | |
|---|---|---|---|---|
| KR | 101982250 B1 * | 8/2019 | ............ | G06Q 10/08 |

* cited by examiner

*Primary Examiner* — Jeff Zimmerman
*Assistant Examiner* — Jorge G Del Toro-Ortega
(74) *Attorney, Agent, or Firm* — ZION IP; Byungwoong Park

(57) ABSTRACT

A method for providing real-time cargo history management service on a graphic user interface (GUI) based on cargo tracking application programming interface (API) linkage. The method includes: automatically generating the GUI of a real-time tracking information window based on a real-time tracking information and a corresponding geographical map based on the real-time tracking information; automatically generating, on the corresponding geographical map, a land departure point, a land destination, a sea departure point, a sea transit point, a sea destination, a current location, and a connecting line from the land departure point to the current location; automatically arranging the GUI of the real-time tracking information window over the corresponding geographical map to display the GUI together with the land departure point, the land destination, the sea departure point, the sea transit point, the sea destination, the current location, and the connecting line, avoiding overlapping each other on a display.

3 Claims, 6 Drawing Sheets

teladia
Save the Planet

ETA 2022. 1. 31(Mon) 00:00 KST

YUHAN KIMBERLY – England port
8x40' DC
8 Containers – 72 Hard Rolls
Shipment No. 3XDJA7V7WCT4

In Ship
Last Update: 35 minutes age

Shipper     Yuhan-Kimberly LTD.
Contact     +82) N/A
Address     300, Olympic-ro Songpa-gu, Seoul
            South Korea Consignee   Kimberly-Clark Europe LTD.
Contact     +44) N/A
Address     East Sussex United Kingdom BN1
            4FU IMAX FREIGHT (Behalf of
            Kimberly-Clark Europe LTD)

Departure 2021. 12. 7 (Tuesday) 17:58 KST
27-4 Dangjeong-dong, Gunpo-si, Gyeonggi-do
South Korea
Local Carrier
N/A

GRAPHIC USER INTERFACE FOR REAL-TIME CARGO HISTORY MANAGEMENT SERVICE BASED ON CARGO TRACKING API LINKAGE

CROSS-REFERENCE TO RELATED APPLICATIONS

This is a continuation in part application claiming priority from U.S. patent application Ser. No. 18/774,922, filed on Jul. 17, 2024, the entire contents of which are hereby incorporated by reference.

BACKGROUND

Technical Field

The present invention relates to a system for providing real-time cargo history management service based on cargo tracking Application Programming Interface (API) linkage, and to a method and system for providing real-time cargo history management service based on cargo tracking API linkage capable of enabling intuitive confirmation of a current cargo location and enabling real-time end-to-end cargo history management on land and sea.

Background Art

Import or export companies that export or import products overseas handle all tasks related to import/export logistics through a forwarding company rather than autonomously handling the tasks. The forwarding company is a logistics service company that comprehensively handles import and export logistics tasks such as customs clearance, including a task for handing over import and export logistics from an import/export company and transporting products.

When most forwarding companies receive a request for an export or import logistics estimate from an import/export company, the forwarding companies calculate a logistics cost by hand, create a estimate, and send the estimate via email.

Further, since detailed information for imported or exported goods is required in order to calculate an accurate maritime logistics cost, and several incidental costs may be incurred according to a law of an export or import country, forwarding companies usually request such information from export or import companies, and the import and export companies must communicate with the forwarding company at least two or three times via email or phone in order to receive a final estimate for the maritime logistics cost. In particular, when an export or import item is a mechanical apparatus, it may take a considerable amount of time to deliver the export or import product since the import/export companies are not familiar with an import/export task. Further, in the case of machines, since the same product is not an item that is exported and imported in large quantities, there is a disadvantage that several communications must be performed with a forwarding company each time for machine export or import.

Further, due to these procedural inconveniences, most import and export companies often continue to transact with existing forwarding companies, and it is not easy to directly compare maritime logistics costs. Accordingly, there is a continuous demand from export and import companies to receive estimates for sea transport more quickly and to receive information for complex logistics systems and logistics costs from ship owners and forwarding companies more transparently. In addition, a function of tracking a current location in real time during transport is required.

A conventional art discloses merely technology for ascertaining a location of a transport skid for utilizing a sensor mounted on a transport vehicle to track a location and movement of the transport vehicle and transporting cargo through the tracking, and a location of the cargo.

SUMMARY

An object of the present disclosure is to provide a graphic user interface (GUI) for real-time cargo history management service based on cargo tracking API linkage capable of enabling intuitive confirmation of a current cargo location and enabling real-time end-to-end cargo history management on land and sea.

Also, an object of the present disclosure is to provide a system for providing real-time cargo history management service based on cargo tracking API linkage.

A system for providing real-time cargo history management service based on cargo tracking API linkage, the system including a service providing server, a user terminal, and a cargo location providing server, wherein the service providing server includes an order management unit configured to create an order when the order management unit receives a transport request including at least one of orderer information, a cargo import/export port, an arrival port, a ship company name, a ship name, a departure date, an arrival date, number of packages, a weight, and a volume from the user terminal; a settlement management unit configured to generate a settlement statement in real time based on the order created by the order management unit and request settlement from the user terminal; and a transport management unit configured to track a location of cargo in real time from the cargo location providing server and provide the location to the user terminal when cargo transport is initiated.

The service providing server further includes a forwarding unit configured to select a transport means based on the order created by the order management unit and process at least one of a customs task, an import/export task, a customs clearance task, and an incidental task related to transport.

The service providing server further includes a warehouse management unit configured to manage warehouses for each orderer based on the orderer information.

When the transport management unit receives a cargo tracking request from the user terminal, the transport management unit receives a current location of the cargo from the cargo location providing server in real time, and provides real-time tracking information so that an initial departure point, a departure time, import/export port, a transit time, and a current location of the cargo are displayed to the user terminal.

The real-time tracking information is able to be shared through at least one of a social network service, a messenger, and a memo, and the system further includes a communication unit capable of sharing a link to the real-time tracking information in real time.

According to the present invention, it is possible to intuitively perform cargo tracking and cargo history management in real time in a mobile application or web page. It is also possible to quickly share digital data without using a traditional forwarder scheme, and to perform an automatic estimate comparison on a platform.

It is also possible to manage digitally created documents safely and conveniently, and to eliminate real-time online tracking and waste through an automatic notification.

It is also possible to provide an integrated logistics solution that supports various industries through multilingual support, HTML5-based OMS reflection for standardization, and mobile-friendly approach.

BRIEF DESCRIPTION OF THE DRAWINGS

FIGS. 4, 5 and 6 illustrate the GUI including a cargo history management application service based on real-time cargo tracking API linkage in an exemplary embodiment.

DETAILED DESCRIPTION OF EXEMPLARY EMBODIMENTS

Figure 1:
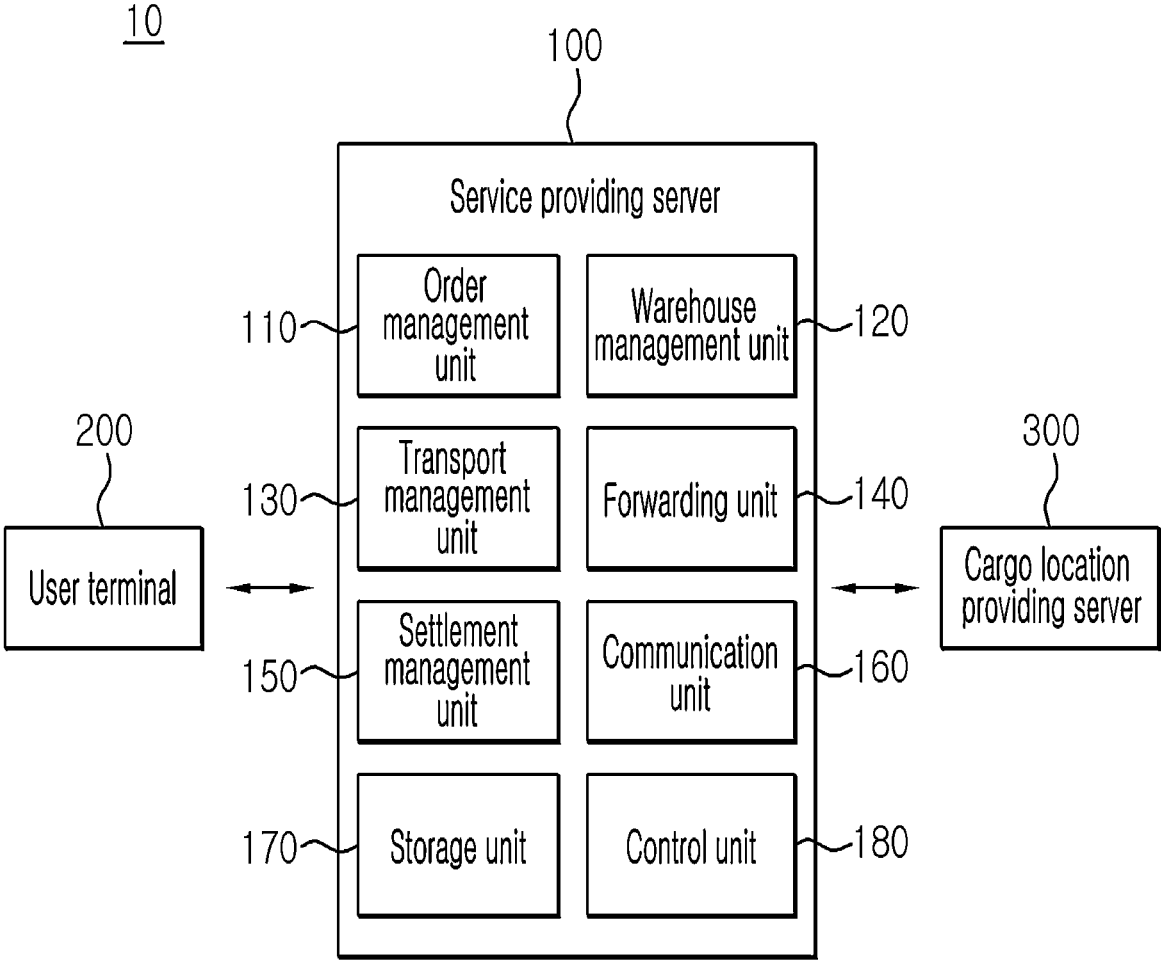
FIG. 1 is a configuration diagram illustrating a system for providing real-time cargo history management service based on cargo tracking API linkage according to an exemplary embodiment.

Specific structural or functional description of embodiments according to the concept of the present invention disclosed in herein are merely illustrative for the purpose of describing the embodiments according to the concept of the present invention. The embodiments according to the concept of the present invention may be implemented in various forms and the present invention are not limited to the embodiments described herein.

Since the embodiments according to the concept of the present invention can be subjected to various changes and have various forms, the embodiments will be illustrated in the drawings and described in detail in the present specification. However, this is not intended to limit the embodiments according to the concept of the present invention to specific disclosed forms, and includes all changes, equivalents, or substitutes included in the spirit and technical scope of the present invention.

The terms used in the present specification are only used to describe specific embodiments and are not intended to limit the present invention. Singular expressions include plural expressions unless the context clearly dictates otherwise. In the present specification, it should be understood that terms such as "comprise" or "have" are intended to designate the presence of features, numbers, steps, operations, components, parts, or combinations thereof described in the present specification, and does not exclude a possibility of the existence or addition of one or more other features, numbers, steps, operations, components, parts, or combinations thereof in advance.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, an Apache MXNet framework, or etc.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Hereinafter, the embodiments of the present invention will be described in detail with reference to the drawings attached to the present specification.

FIG. 1 is a configuration diagram illustrating a system for providing real-time cargo history management service based on cargo tracking API linkage according to an embodiment of the present invention.

Referring to FIG. 1, it includes a service providing server 100, a user terminal 200, and a cargo location providing server 300. An orderer may enter product information for a product that the orderer wishes to transport through a dedicated application installed on a user terminal. The orderer may perform user authentication by transferring previously entered orderer information to the service providing server.

When the service providing server 100 receives a transport request from the user terminal 200, the service providing server 100 may manage an order, automatically create an order, manage a warehouse for each orderer, performs all forwarding-related tasks, automatically perform settlement to request a payment in real time, receive a current location from the cargo location providing server, generate tracking information, and provide the tracking information to the user terminal in real time. The service providing server 100 may provide the tracking information to the user terminal in real time to enable end-to-end cargo history management that is confirmed through an intuitive interface.

The service providing server 100 can be linked to a large number of user terminals and cargo location providing servers through API linkage for real-time cargo tracking.

The service providing server 100 includes an order management unit 110, a warehouse management unit 120, a transport management unit 130, a forwarding unit 140, a settlement management unit 150, a communication unit 160, a storage unit 170, and a control unit 180.

The order management unit 110 automatically creates an order when the order management unit 110 receives a transport request including at least one of orderer information, a cargo import/export port, an arrival port, a ship company name, a ship name, a departure date, an arrival date, number of packages, a weight, and a volume from the user terminal. According to the embodiment, a transport request that includes at least one input means for inputting ship cargo item information, ship cargo transport information, and ship cargo freight estimate information, the number of containers held according to ships operated by at least one ship owner, ship operation information (transport time, transit section, and departure/arrival date), information on a quantity of ship cargo that can be transported, shipping freight information for each shipping section according to the number of ship cargoes, a standard of a container of a ship on which ship cargo will be loaded, container number, container seal number, and container location information, differential service usage fee based on ship cargo transport request information, shipping freight, the number of containers held according to ships operated by the ship owner, the ship operation information (transport time, transit section, and departure/arrival date), the information on a quantity of ship cargo that can be transported, and shipping information and shipping freight information for each shipping section depending on the number of ship cargoes may be received. The description in the present specification focuses on a ship, but the present disclosure is not limited thereto and can also be applied to aviation.

The warehouse management unit 120 manages warehouses for each orderer based on the orderer information. The warehouse management unit 120 may be linked to a logistics automation facility control system based on Internet of Things to perform automatic warehouse, automated shipping equipment, automatic sorter, and AGV functions.

When cargo transport is initiated, the transport management unit 130 tracks a location of the cargo in real time from the cargo location providing server and provides the location to the user terminal. When the transport management unit 130 receives a cargo tracking request from the user terminal, the transport management unit 130 receives a current location of the cargo from the cargo location providing server in real time, and provides real-time tracking information so that an initial departure point, a departure time, import/export port, a transit time, and a current location of the cargo are displayed to the user terminal.

The forwarding unit 140 selects a transport means based on the order created by the order management unit and processes at least one of a customs task, an import/export task, a customs clearance task, and an incidental task related to transport.

The settlement management unit 150 generates a settlement statement in real time based on the order created by the order management unit and requests the user terminal to perform settlement. The settlement management unit 150 may analyze and extract ship owner information that matches ship cargo transport information of ship owner information, analyzes an item, number, weight, volume, and HS code of the ship cargo, analyze whether the ship cargo is a regional specialty to calculate a freight fee that is a sum of a shipping freight and a preset service_fee suggested by the extracted ship owner information, analyze and extract at least one ship owner information that can accommodate the ship cargo, analyze and extract at least one ship owner information including a transport route of the ship cargo among the extracted at least one ship owner information, provide ship owner information presenting ship freight information in descending order of matching rank with the ship cargo freight estimate information among the at least one extracted ship owner information, in descending or ascending order, differently determine a commission with a preset margin depending on a volume of the ship cargo, the presence or absence of regional special ship cargo, a weight of the ship cargo, and characteristics of an item, and provide the commission.

The communication unit 160 shares a link of the real-time tracking information in real time. The real-time tracking information can be shared through at least one of a social network service, a messenger, and a memo. The communication unit 160 communicates with the user terminal 200 and the cargo location providing server 300 through a network, and the network includes a local area network (LAN), a wide area network (WAN), a value added network (VAN), a mobile radio communication network, a satellite communication network, and a combination thereof, is a data communication network having a comprehensive meaning that allows network constituent entities illustrated in FIG. 1 to smoothly communicate with each other, and may include wired Internet, wireless Internet, and a mobile wireless communication network. Further, wireless communication includes, for example, wireless LAN (Wi-Fi), Bluetooth, Bluetooth low energy, ZigBee, WFD (Wi-Fi Direct), UWB (ultra wideband), infrared communication (IrDA; infrared Data Association), and NFC (Near Field Communication), but are not limited thereto.

The storage unit 170 can store the generated order and real-time tracking information.

The control unit 180 includes operating installed software for control each configuration of the service providing server, and may control the order management unit 110, the warehouse management unit 120, the transport management unit 130, the forwarding unit 140, the settlement management unit 150, the communication unit 160, and the storage unit 170. The control unit 180 may perform a function of creating an API that is provided to the user terminal and managing the provided API.

Figure 2:
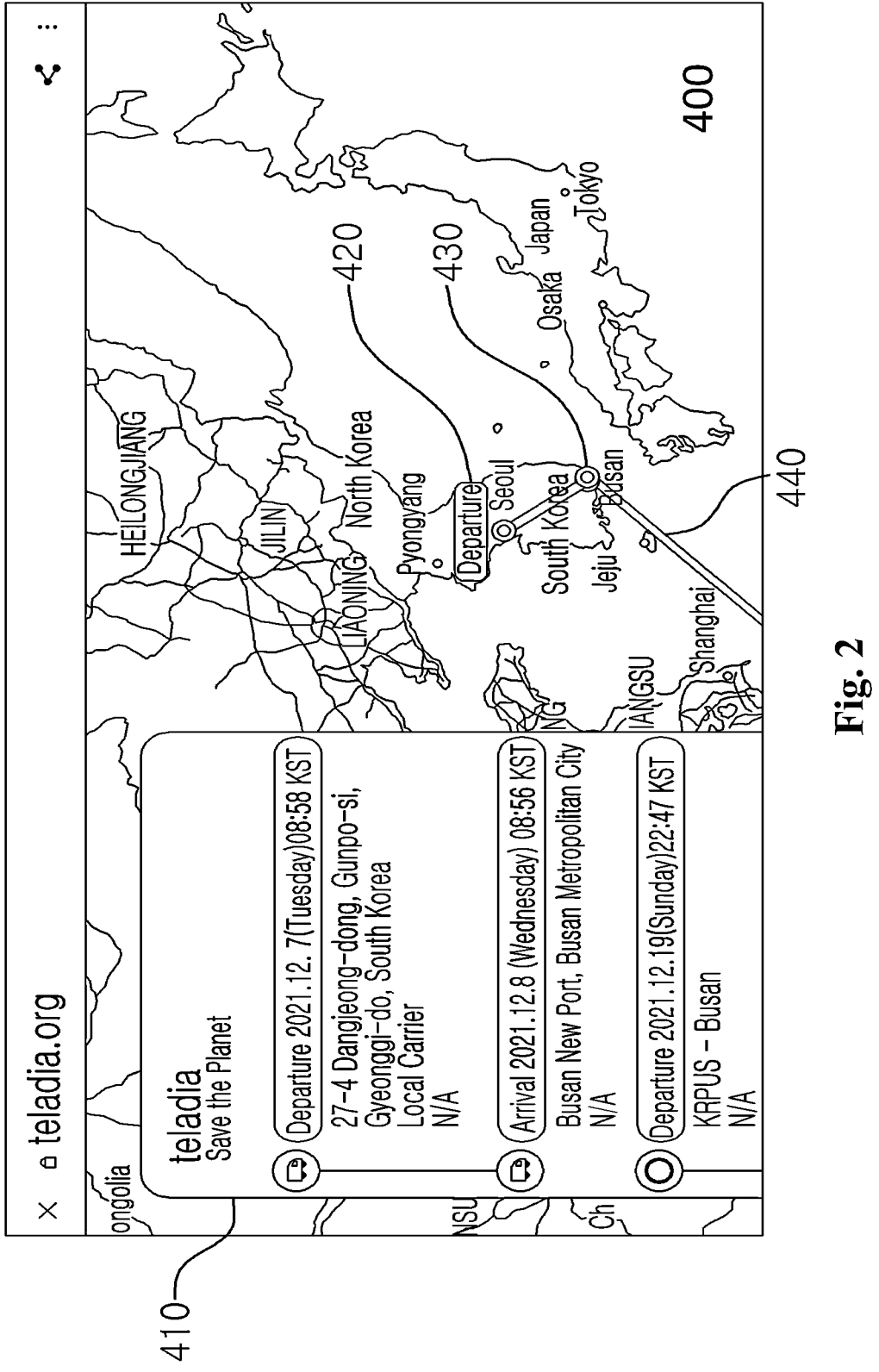
FIGS. 2 and 3 illustrate the GUI including the cargo history management service based on real-time cargo tracking API linkage of an exemplary embodiment.
Figure 3:
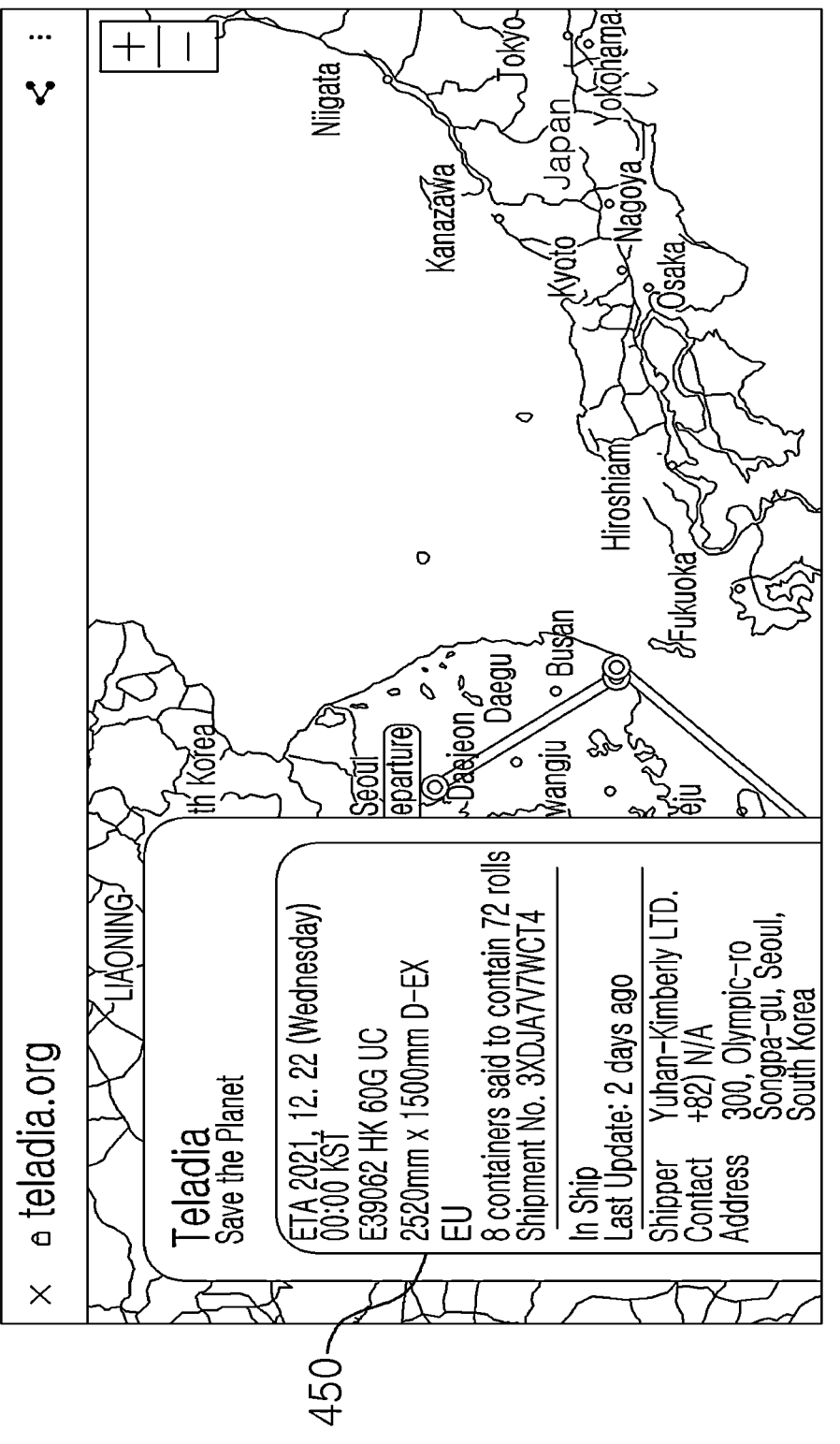

FIGS. 2 and 3 illustrate the GUI including the cargo history management service based on real-time cargo tracking API linkage of an exemplary embodiment. Also, FIGS. 4 to 6 illustrate the GUI including a cargo history management application service based on real-time cargo tracking API linkage in an exemplary embodiment.

Referring now to FIGS. 2 and 3, FIGS. 2 and 3 show the GUI of real-time tracking information window 410 on a user terminal including, for example, a mobile phone, a personal computer, or etc. The GUI of real-time tracking information window 410 may be automatically arranged over a geographical map 400 and displayed together with the map 400 so that the user can conveniently give an intuitive confirmation based on the map 400 and the window 410. The geographical map 400 may show a land departure point 420, a land destination, a sea departure point 430, a sea transit point and a sea destination, a current location, and a connecting line 440 from the land departure point to the current location together with the information window 410 for the user's intuitive confirmation based on the displaying information. Further, orderer information, order information, and attached files may further be shown (450) on the window 410 for the user's convenience. In that regard, according to an exemplary embodiment, the GUI of the real-time tracking information window 410 over the corresponding geographical map 400 may automatically be sized and arranged for the GUI to be displayed together with the land departure point, the land destination, the sea departure point, the sea transit point, the sea destination, the current location, and the connecting line, avoiding overlapping each other as possible. According to an exemplary embodiment, the size of the overlapping and the size of the displayed portions of the cargo tracking in the map 400 (the land departure point 420, the land destination and sea departure point 430, the sea transit point, the sea destination, and the current location, and the connecting line 440 from the land departure point to the current location) are automatically calculated and compared with each other. In an exemplary embodiment, if the ratio of the overlapping portion is more than 10%, the window 410, the map 400 and/or the displayed portions of the cargo tracking in the map 400 are resized and/or rearranged in the display. Further, if the overlapping portion covers any critical points in the map 400 (for example: the land departure point 420; the land destination and sea departure point 430; the sea transit point and the sea destination; and the current location), the window 410, the map 400 and/or the displayed portions of the cargo tracking in the map 400 are resized and/or rearranged in the display.

Figure 4:
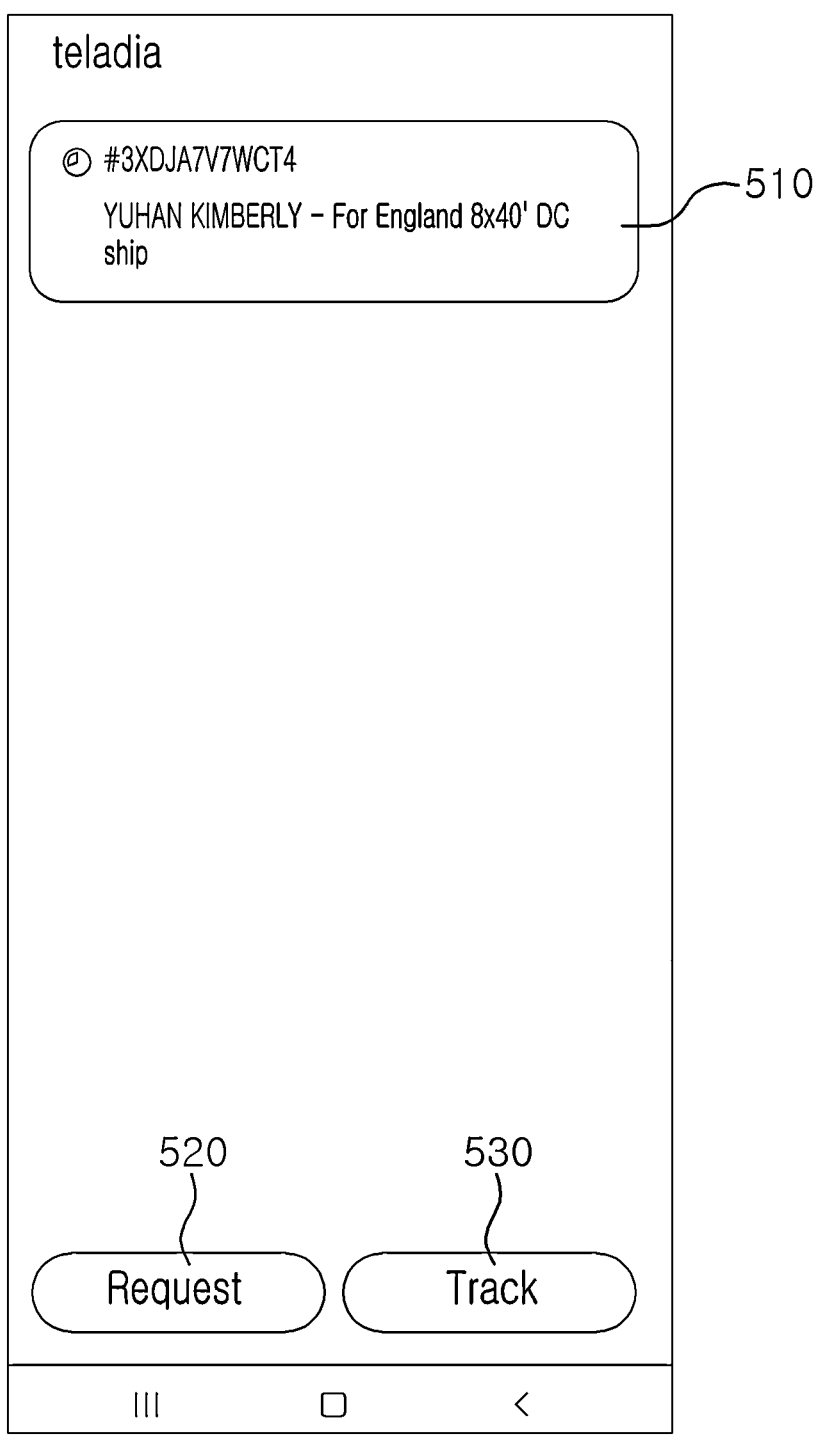
Figure 6:
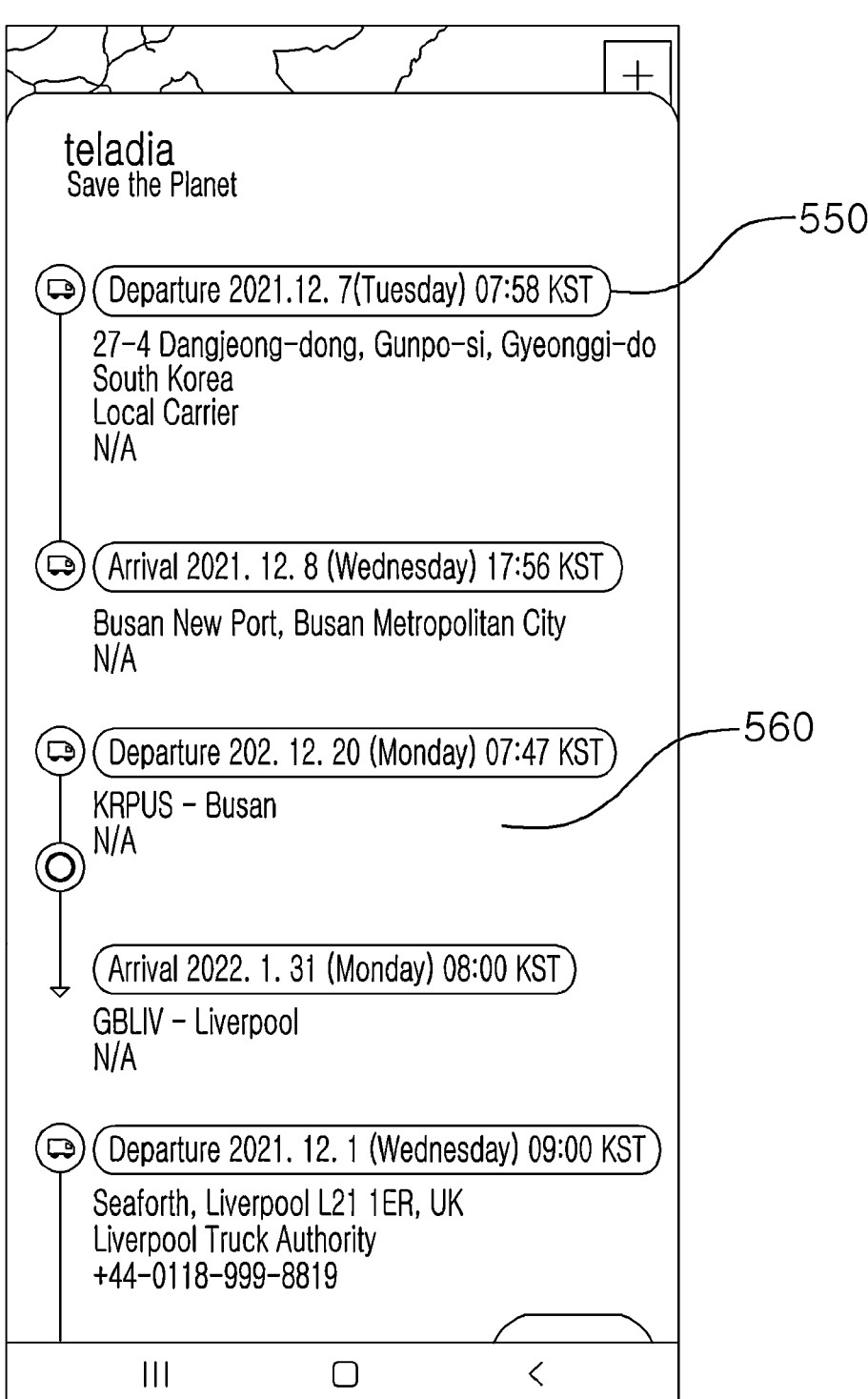

Referring now to FIGS. 4 to 6, the user terminal may select an order request 520 and tracking 530 at the window 410 as, for example, a mobile application service. When the order request 520 is selected, essential information, end-to-end information, book document upload, and a template to fill out requests are provided, and text and information of an uploaded document can be scanned with Optical Character Recognition (OCR) so that the text and information are automatically input.

Further, when the order request has already been completed, transport information 510 may be displayed in an upper portion. When the transport information is selected, detailed information may be displayed (540) and tracking information 550 and 560 may be displayed. The tracking information may be displayed separately as tracking information 550 for land and tracking information 560 for sea.

The invention has been described with reference to the embodiments shown in the drawings, but this is merely illustrative, and those skilled in the art will understand that various modifications and other equivalent embodiments are possible therefrom. Therefore, the true scope of technical protection of the present invention should be determined by the technical spirit of the attached registered claims.

What is claimed is:

1. A method for providing real-time cargo history management service on a graphic user interface (GUI) based on cargo tracking application programming interface (API) linkage, the method comprising:

automatically generating a real-time tracking information window of the GUI based on a real-time tracking information;

automatically generating a corresponding geographical map based on the real-time tracking information;

automatically generating, on the corresponding geographical map, a cargo tracking portion, the cargo tracking portion includes a land departure point, a land destination, a sea departure point, a sea transit point, a sea destination, a current location, and a connecting line from the land departure point to the current location;

automatically arranging the real-time tracking information window of the GUI over the corresponding geographical map to display the GUI together with the land departure point, the land destination, the sea departure point, the sea transit point, the sea destination, the current location, and the connecting line, avoiding overlapping each other on a display; and automatically displaying, on a user terminal, the arranged GUI and the arranged corresponding geographical map, wherein a first size of an overlapping portion of the real-time tracking information window and a second size of the cargo tracking portion are automatically calculated and compared with each other, the real-time tracking information window, the corresponding geographical map and the cargo tracking portion are automatically resized and rearranged before being displayed until:

a ratio of the first size and the second size becomes less than 10%; and the land departure point, the land destination, the sea departure point, the sea transit point, the sea destination and the current location are uncovered by the overlapping portion, wherein the method further comprises:

receiving, via the GUI on the user terminal, a transport request including orderer information, a cargo import/export port, an arrival port, a ship company name, a ship name, a departure date, an arrival date, number of packages, a weight, and a volume from the user terminal;

automatically generating an order based on the transport request;

automatically generating a settlement statement in real time based on the automatically generated order;

requesting, via the GUI, settlement from the user terminal;

automatically tracking a location of cargo in real time and automatically providing the location to the user terminal when cargo transport is initiated;

automatically analyzing and extracting ship owner information that matches cargo transport information of ship owner information;

automatically analyzing and extracting at least one ship owner information that is capable of accommodating the cargo;

automatically analyzing and extracting at least one ship owner information including a transport route of the cargo among the extracted at least one ship owner information;

automatically arranging and displaying the GUI with ship owner information presenting ship freight information in descending order of matching rank with cargo freight estimate information among the at least one automatically extracted ship owner information;

automatically determining a corresponding commission with a predetermined margin based on a volume of the cargo, a presence of a predetermined cargo, a weight of the cargo, and characteristics of an item;

automatically displaying, on the GUI, the determined commission;

automatically selecting a transport means based on the automatically generated order;

automatically processing a customs task, an import/export task, a customs clearance task, and an incidental task related to transport; and automatically managing warehouses for each orderer based on the orderer information, wherein the method further comprises:

receiving, via the GUI, a cargo tracking request from the user terminal;

automatically receiving a current location of the cargo in real time; and automatically displaying on the user terminal, the real-time tracking information together with the land departure point, a departure time, import/export port, a transit time, and the current location of the cargo.

2. A system for providing real-time cargo history management service on a graphic user interface (GUI) based on cargo tracking application programming interface (API) linkage, the system comprises a processor and one or more memory devices communicatively coupled to the processor, and the one or more memory devices stores instructions operable when executed by the processor to perform:

automatically generating a real-time tracking information window of the GUI based on a real-time tracking information;

automatically generating a corresponding geographical map based on the real-time tracking information;

automatically generating, on the corresponding geographical map, a cargo tracking portion, the cargo tracking portion includes a land departure point, a land destination, a sea departure point, a sea transit point, a sea destination, a current location, and a connecting line from the land departure point to the current location;

automatically arranging the real-time tracking information window of the GUI over the corresponding geographical map to display the GUI together with the land departure point, the land destination, the sea departure point, the sea transit point, the sea destination, the current location, and the connecting line, avoiding overlapping each other on a display; and automatically displaying, on a user terminal, the arranged GUI and the arranged corresponding geographical map, wherein a first size of an overlapping portion of the real-time tracking information window and a second size of the cargo tracking portion are automatically calculated and compared with each other, the real-time tracking information window, the corresponding geographical map and the cargo tracking portion are automatically resized and rearranged before being displayed until:

a ratio of the first size and the second size becomes less than 10%; and the land departure point, the land destination, the sea departure point, the sea transit point, the sea destination and the current location are uncovered by the overlapping portion, wherein the one or more memory devices stores instructions operable when executed by the processor to further perform:

receiving, via the GUI on the user terminal, a transport request including orderer information, a cargo import/export port, an arrival port, a ship company name, a ship name, a departure date, an arrival date, number of packages, a weight, and a volume from the user terminal;

automatically generating an order based on the transport request;

automatically generating a settlement statement in real time based on the automatically generated order;

requesting, via the GUI, settlement from the user terminal;

automatically tracking a location of cargo in real time and automatically providing the location to the user terminal when cargo transport is initiated;

automatically analyzing and extracting ship owner information that matches ship cargo transport information of ship owner information;

automatically analyzing and extracting at least one ship owner information that is capable of accommodating the cargo;

automatically analyzing and extracting at least one ship owner information including a transport route of the ship cargo among the extracted at least one ship owner information;

automatically arranging and displaying the GUI with ship owner information presenting ship freight information in descending order of matching rank with cargo freight estimate information among the at least one automatically extracted ship owner information;

automatically determining a corresponding commission with a predetermined margin based on a volume of the cargo, a presence of a predetermined ship cargo, a weight of the cargo, and characteristics of an item;

automatically displaying, on the GUI, the determined commission;

automatically selecting a transport means based on the automatically generated order;

automatically processing a customs task, an import/export task, a customs clearance task, and an incidental task related to transport; and automatically managing warehouses for each orderer based on the orderer information, wherein the one or more memory devices stores instructions operable when executed by the processor to further perform:

receiving, via the GUI, a cargo tracking request from the user terminal;

automatically receiving a current location of the cargo in real time; and automatically displaying on the user terminal, the real-time tracking information together with the land departure point, a departure time, import/export port, a transit time, and the current location of the cargo.

3. A non-transitory computer readable recording medium including executable instructions, wherein the instructions, when executed by a processor, cause the processor to perform a method for providing real-time cargo history management service on a graphic user interface (GUI) based on cargo tracking application programming interface (API) linkage, the method comprising:

automatically generating a real-time tracking information window of the GUI based on a real-time tracking information;

automatically generating a corresponding geographical map based on the real-time tracking information;

automatically generating, on the corresponding geographical map, a cargo tracking portion, the cargo tracking portion includes a land departure point, a land destination, a sea departure point, a sea transit point, a sea destination, a current location, and a connecting line from the land departure point to the current location;

automatically arranging the real-time tracking information window of the GUI over the corresponding geographical map to display the GUI together with the land departure point, the land destination, the sea departure point, the sea transit point, the sea destination, the current location, and the connecting line, avoiding overlapping each other on a display; and automatically displaying, on a user terminal, the arranged GUI and the arranged corresponding geographical map, wherein a first size of an overlapping portion of the real-time tracking information window and a second size of the cargo tracking portion are automatically calculated and compared with each other, the real-time tracking information window, the corresponding geographical map and the cargo tracking portion are automatically resized and rearranged before being displayed until:

a ratio of the first size and the second size becomes less than 10%; and the land departure point, the land destination, the sea departure point, the sea transit point, the sea destination and the current location are uncovered by the overlapping portion, wherein the method further comprises:

receiving, via the GUI on the user terminal, a transport request including orderer information, a cargo import/export port, an arrival port, a ship company name, a ship name, a departure date, an arrival date, number of packages, a weight, and a volume from the user terminal;

automatically generating an order based on the transport request;

automatically generating a settlement statement in real time based on the automatically generated order;

requesting, via the GUI, settlement from the user terminal;

automatically tracking a location of cargo in real time and automatically providing the location to the user terminal when cargo transport is initiated;

automatically analyzing and extracting ship owner information that matches ship cargo transport information of ship owner information;

automatically analyzing and extracting at least one ship owner information that is capable of accommodating the cargo;

automatically analyzing and extracting at least one ship owner information including a transport route of the cargo among the extracted at least one ship owner information;

automatically arranging and displaying the GUI with ship owner information presenting ship freight information in descending order of matching rank with cargo freight estimate information among the at least one automatically extracted ship owner information;

automatically determining a corresponding commission with a predetermined margin based on a volume of the cargo, a presence of a predetermined cargo, a weight of the cargo, and characteristics of an item;

automatically displaying, on the GUI, the determined commission;

automatically selecting a transport means based on the automatically generated order;

automatically processing a customs task, an import/export task, a customs clearance task, and an incidental task related to transport; and automatically managing warehouses for each orderer based on the orderer information, wherein the method further comprises:

receiving, via the GUI, a cargo tracking request from the user terminal;

automatically receiving a current location of the cargo in real time; and automatically displaying on the user terminal, the real-time tracking information together with the land departure point, a departure time, import/export port, a transit time, and the current location of the cargo.

* * * * *